S. BROWN.
Machine for Making Balls out of Leather Scraps and Similar Material.

No. 216,305. Patented June 10, 1879.

WITNESSES. INVENTOR.

UNITED STATES PATENT OFFICE.

SAMUEL BROWN, OF PHILADELPHIA, PENNSYLVANIA, ASSIGNOR OF ONE-HALF HIS RIGHT TO BENJAMIN F. SHIBE, OF SAME PLACE.

IMPROVEMENT IN MACHINES FOR MAKING BALLS OUT OF LEATHER SCRAPS AND SIMILAR MATERIAL.

Specification forming part of Letters Patent No. 216,305, dated June 10, 1879; application filed April 30, 1879.

*To all whom it may concern:*

Be it known that I, SAMUEL BROWN, of Philadelphia, Pennsylvania, have invented a new and useful Machine for Making Balls out of Leather Scraps and Similar Material by Pressure, of which the following is a specification, reference being had to the accompanying drawings, wherein—

Figure 1:
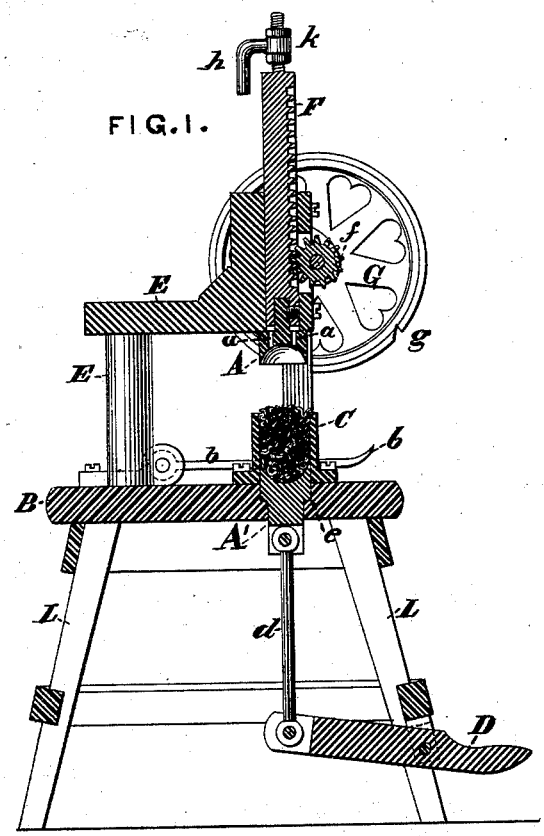
Figure 2:
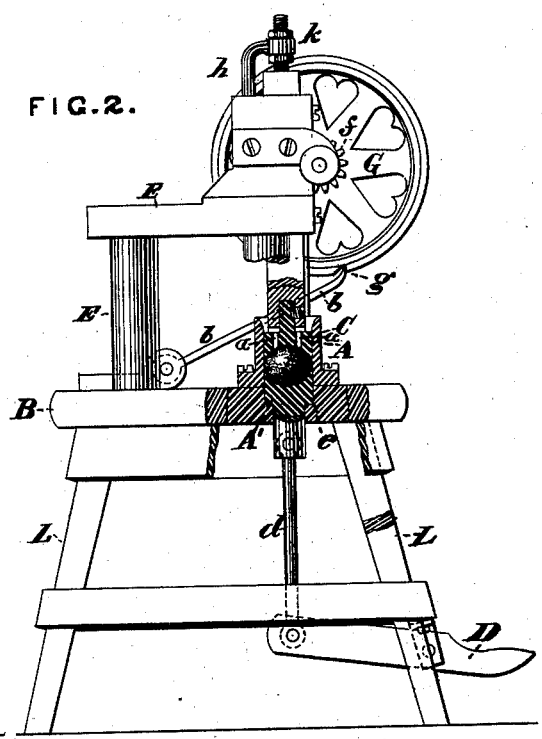
Figures 3, 4, 5:
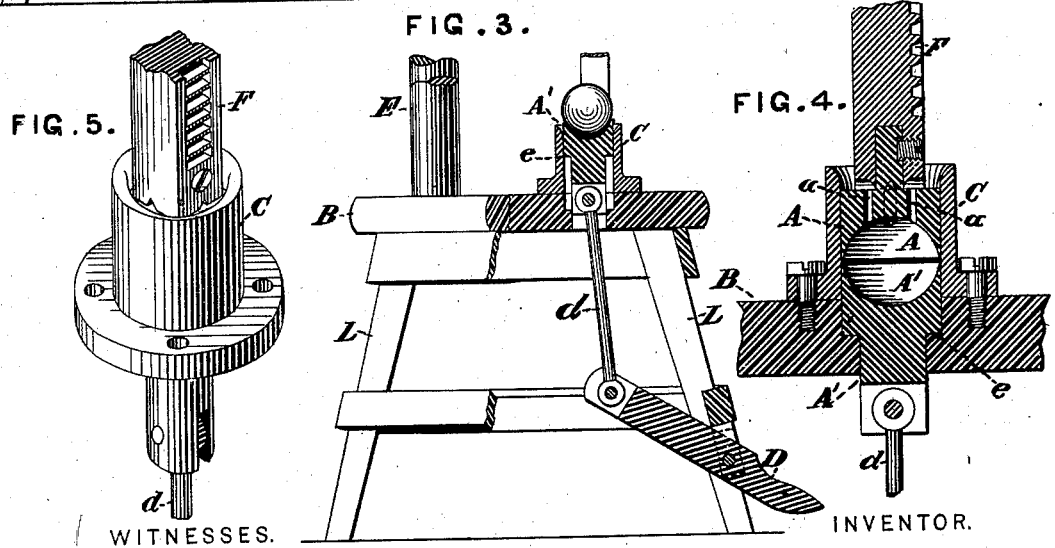

Figure 1 represents a vertical section through the center of the machine, showing the upper die raised and the lower die filled with material ready to be pressed. Fig. 2 is a view, partly in elevation and partly in section, showing the dies, together with the material compressed between them. Fig. 3 is a view, partly in elevation and partly in section, showing the lower die when elevated so as to throw out the molded ball. Fig. 4 is a view, on an enlarged scale, in section through both dies, showing the details of their construction; and Fig. 5 is a perspective view of the cylinder in which the dies meet. The sections are all on the same plane.

In the manufacture of balls from scraps of leather or other similar articles it has hitherto been customary to compress the material into a spherical form by winding it tightly with yarn or thread and continuously beating the mass with mallets or bats during the process of winding. Attempts have also been made to compress the material into a ball by driving it into a series of holes of constantly-diminishing diameters. The length of time, care, and skill required for these methods render them undesirable for the manufacture of this cheap class of balls, and the latter is, moreover, very uncertain in its results.

The object of my invention is to produce a ball of accurate and uniform shape with great rapidity and ease of manipulation.

Upon a stout base-plate, B, elevated upon legs L, is firmly mounted a vertical hollow cylinder, C, countersunk or beveled at its upper end, as shown, so as to form a bell-mouthed opening. Closely fitting within this cylinder is the lower die, A', with a shoulder, e, which rests upon a corresponding portion of the bed-plate B. A foot-lever, D, and rod d are connected with the lower die, A', by which it can be raised within the cylinder C, so as to eject the molded ball. A stout frame-work, E, supports the upper die, A, which is worked by a rack, F, and pinion f. A heavy hand-wheel, G, by which the pinion f is revolved, serves to give the necessary momentum to the descending die A, and is provided with a notch, g, and pawl b. The upper end of the rack F is provided with a stop, h, by which its descent is limited and injury to the edges of the dies is prevented. This stop is arranged with a screw and jam-nuts, as shown at k, so as to be vertically adjustable.

The dies A and A' are preferably made of steel, and fit very accurately in the cylinder C. Their edges are sharp, and the cavity in each, though a portion of a true sphere, is somewhat less than a hemisphere, so that when the two are brought in contact, as shown in Fig. 2, the mold formed by them nearly resembles in shape an oblate spheroid. This is an important feature of my improvement, since the expansion of the material when the pressure is released tends to loosen and throw out the ball, instead of binding it tightly within the die, as is the case when the cavity in each is a true hemisphere.

The die A is provided with air-passages a a, to prevent the ball from being torn apart by the suction when the die is withdrawn.

The operation is as follows: The die A being raised and the die A' being lowered until its shoulder e rests upon the bed-plate, a quantity of scraps or other similar material, of proper weight and bulk, is placed in the cylinder C. This is shown in Fig. 1. The wheel G is then rapidly revolved, when the rack F descends and forces the die A upon the mass of material, compressing it in the mold formed by the two dies. The pawl b is then raised, and engages with the notch g, holding the dies together until a second charge of material is ready for pressure. This is shown in Fig. 2. The die A is then withdrawn and the foot-lever D depressed, raising the lower die, A', and ejecting the ball from the cylinder C, as shown in Fig. 3. It is then covered.

The elasticity of the material makes the ball assume a spherical shape when the vertical pressure is released, and at the same time springs it loose from the die, as previously stated.

The beveled opening or bell-mouth of the cylinder C acts as a funnel to receive the material, and also prevents the descending die from being broken or thrown out of line by pieces of material getting jammed between its edge and the edge of the opening, as is liable to occur when the upper die fits the mouth of the cylinder closely. It also obviates the necessity of very accurately centering the upper die.

I claim—

1. In a machine for making balls from scraps or other elastic material by pressure, a die having its cavity substantially of the form specified and shown, whereby the expansion of the material on the removal of pressure frees the ball from the die.

2. In a machine for making balls from scraps or other elastic material by pressure, a die having air-holes, substantially as and for the purpose set forth.

3. In combination with the dies, closely fitting therein, the cylinder C, having a beveled or flaring mouth, substantially as described and shown.

4. The combination of a sharp-edged die with a rack and pinion and stop, substantially as described.

5. The combination of the cylinder and shouldered die sliding therein with a foot-lever and rod, substantially as described.

6. The combination, with a die for pressing elastic material, of a rack and pinion, notched fly-wheel, and pawl, substantially as described.

SAMUEL BROWN.

Witnesses:
  WM. H. MYERS,
  G. B. HORNER.